United States Patent
Madison

(10) Patent No.: US 9,341,191 B2
(45) Date of Patent: May 17, 2016

(54) THRUST EQUALIZING MECHANISM FOR CRYOGENIC TURBINE GENERATOR

(71) Applicant: Ebara International Corporation, Sparks, NV (US)

(72) Inventor: Joel V. Madison, Sparks, NV (US)

(73) Assignee: EBARA International Corporation, Sparks, NV (US)

( * ) Notice: Subject to any disclaimer, the term of this patent is extended or adjusted under 35 U.S.C. 154(b) by 471 days.

(21) Appl. No.: 13/957,314

(22) Filed: Aug. 1, 2013

(65) Prior Publication Data

US 2014/0028026 A1    Jan. 30, 2014

Related U.S. Application Data

(60) Division of application No. 12/794,649, filed on Jun. 4, 2010, now Pat. No. 8,513,847, which is a continuation-in-part of application No. 10/776,555, filed on Feb. 10, 2004, now abandoned.

(60) Provisional application No. 60/446,460, filed on Feb. 10, 2003.

(51) Int. Cl.
*H02K 7/18* (2006.01)
*F04D 29/041* (2006.01)
(Continued)

(52) U.S. Cl.
CPC .............. *F04D 29/041* (2013.01); *F01D 25/16* (2013.01); *F04D 29/051* (2013.01); *F16C 19/52* (2013.01); *F16C 41/02* (2013.01); *H02K 5/1672* (2013.01); *H02K 7/1823* (2013.01); *F05D 2230/642* (2013.01); *F05D 2240/52* (2013.01);
(Continued)

(58) Field of Classification Search
CPC .... H02K 5/1672; H02K 7/1823; F01D 25/16; F04D 29/041; F04D 29/051; F05D 2230/642; F05D 2240/52; F05D 2250/315; F05D 2300/50212; F16C 19/52; F16C 41/02
USPC ....................... 310/52, 54, 89, 90, 91; 290/52
IPC ........................................................ H02K 7/18
See application file for complete search history.

(56) References Cited

U.S. PATENT DOCUMENTS

| 661,738 | A | * | 11/1900 | Chuta | .................. | A01K 15/006 |
| | | | | | | 119/767 |
| 2,760,093 | A | * | 8/1956 | Button | .................. | H02K 21/20 |
| | | | | | | 310/127 |

(Continued)

OTHER PUBLICATIONS

Trident Plastic Inc., Data sheet of NEMA G 11 glass epoxy sheet, 2007.

(Continued)

*Primary Examiner* — John K Kim
(74) *Attorney, Agent, or Firm* — Ray K Shahani, Esq.; Kin Hung Lai

(57) ABSTRACT

An improvement for a turbine generator or pump having main bearings separated by a span of shaft and a thrust equalizing mechanism adjacent one of said main bearings, the improvement comprising a stationary length compensator interposed between the thrust equalizing mechanism and its adjacent main bearing to reduce the span between said main bearings. Preferably the length compensator is composed of material that shrinks less than the shaft of the generator, and the height of the length compensator, i.e., the compensating dimension, is selected according to desired thrust equalizing mechanism operating parameters over a temperature range.

4 Claims, 5 Drawing Sheets

(51) Int. Cl.
  *F01D 25/16* (2006.01)
  *F16C 19/52* (2006.01)
  *F16C 41/02* (2006.01)
  *H02K 5/167* (2006.01)
  *F04D 29/051* (2006.01)

(52) U.S. Cl.
  CPC . *F05D2250/315* (2013.01); *F05D 2300/50212* (2013.01)

(56) References Cited

U.S. PATENT DOCUMENTS

| | | | |
|---|---|---|---|
| 4,250,418 A * | 2/1981 | Eckels | H02K 9/20 310/54 |
| 5,243,242 A | 9/1993 | Cap et al. | |
| 5,392,178 A | 2/1995 | Nishio et al. | |
| 5,598,047 A | 1/1997 | Sakuragi et al. | |
| 5,659,205 A * | 8/1997 | Weisser | F03B 13/10 290/43 |
| 5,821,646 A | 10/1998 | Chuta et al. | |
| 6,351,045 B1 | 2/2002 | Shoykhet | |
| 8,513,847 B2 * | 8/2013 | Madison | F01D 25/16 290/52 |
| 2001/0022478 A1 | 9/2001 | Obara et al. | |
| 2003/0094870 A1 * | 5/2003 | Obara | G11B 19/2009 310/90 |
| 2008/0012440 A1 | 1/2008 | Zhong et al. | |
| 2008/0122226 A1 * | 5/2008 | Madison | F01D 13/00 290/52 |
| 2009/0074560 A1 | 3/2009 | Madison | |
| 2011/0210556 A1 | 9/2011 | Madison | |
| 2014/0028026 A1 * | 1/2014 | Madison | F01D 25/16 290/52 |
| 2014/0037424 A1 | 2/2014 | Madison | |

OTHER PUBLICATIONS

Wikipedia.com, title 'Thermal expansion', 2012.

* cited by examiner

THRUST EQUALIZING MECHANISM FOR CRYOGENIC TURBINE GENERATOR

RELATED APPLICATIONS

This Application is a Divisional application of U.S. patent application Ser. No. 12/794,649 filed Jun. 4, 2010, U.S. Pat. No. 8,513,847, to be issued Aug. 20, 2013, entitled "THRUST BALANCING DEVICE FOR CRYOGENIC FLUID MACHINERY", which is a Continuation-In-Part application to U.S. patent application Ser. No. 10/776,555 filed Feb. 10, 2004, entitled "THRUST BALANCING DEVICE FOR CRYOGENIC FLUID MACHINERY", which is related to and a Non-Provisional application of U.S. Patent Application No. 60/446,460 filed Feb. 10, 2003, entitled "THRUST BALANCING DEVICE FOR CRYOGENIC FLUID MACHINERY", which are all incorporated herein by reference in their entirety, and claims any and all benefits to which they are entitled therefrom.

FIELD OF THE INVENTION

The present invention relates in general to means and methods for balancing the thrust felt by pumps and turbine generators operating in a cryogenic environment, and in particular to a novel improvement in a thrust balancing configuration to enhance the rotordynamic behavior of vertical cryogenic pumps and turbine generators.

BACKGROUND OF THE INVENTION

The Liquid Natural Gas, hereafter "LNG", production plants currently in the design stages are utilizing economy of scale to increase production with lower capital costs, which has the effect of increasing the power ratings of the critical rotating equipment being supplied. As the power requirements increase with the demand for the next generation of liquefaction plants, the generator size must increase physically. As the generator is the dominant component in terms of rotordynamic stability, the increased size has negative ramifications to the machine reliability. For example, higher power ratings of variable speed hydraulic turbine generators implicitly require larger physical sizes, but the possible loss of generator load demands critical speed separation below continuous speed and above maximum "breakaway" speed. Furthermore, in the design of cryogenic turbine generators and pumps, there limitations on bearing size, shaft diameter and overall diameter of machines of this type. This invention presents a solution for increasing the generator size, and power rating, while still maintaining acceptable rotordynamic characteristics.

For vertical cryogenic turbine generators, power increases of up to 10% can be achieved by reducing the span between the main bearings which offsets the reduction in the critical speed resulting from the increased generator size. However this is not readily accomplished in machines having ball bearings which are cooled and lubricated by the product fluid. This is because the upper main bearing needs to be located outside of the generator end turns to avoid any possible electrical effects associated from the variable speed electrical control system of the generator, and the lower bearing is typically integral to a thrust balancing system which is necessary due to the low viscosity of liquefied hydrocarbon gases. The thrust balancing system is necessary to eliminate the thrust generated by the hydraulic components against the bearings in order to achieve adequate running time between overhauls. The TEMs (Thrust Equalizing Mechanism) mechanisms incorporated in machinery designed by Ebara International Corporation, Sparks, Nev., are good examples of such thrust balancing mechanisms which employ a combination of fixed and variable orifices, but there are limitations with regards to location, length and resultant variable orifice gap size. This invention provides a way for the lower bearing to be disposed closer to the upper bearing, thereby reducing the gap therebetween, without interfering with the thrust balancing mechanism.

U.S. Pat. No. 3,104,553, patented Sep. 24, 1963 to Traeder et al. discloses a mechanical system arrangement for preventing repositioning or mass shift of the components in an assembly due to temperature changes. The patent does not describe hydraulic cryogenic machinery which is the subject the present invention.

U.S. Pat. No. 6,296,765, patented Mar. 8, 1988 to Brown discloses a composite sleeve over a rotor hub with magnets. However, Brown is not related to hydraulic cryogenic machinery. In addition, Brown does not describe the magnetic coupling of the present invention which functions to seal the rotor hub or motor/generator from the hydraulic portion.

U.S. Pat. No. 6,119,553, patented Sep. 19, 2000 to Yamagishi et al. discloses a rotation transmitting device that introduces rotation into a vacuum side space via a flexible meshing type gear drive from an atmosphere side space. Yamagishi et al. is unrelated to hydraulic machinery operated under cryogenic conditions and handling cryogenic liquids.

Other advantages and attributes of this invention will be readily discernable upon a reading of the text hereinafter.

SUMMARY OF INVENTION

An object of this invention is to provide a way for the lower bearing to be disposed closer to the upper bearing, thereby reducing the gap therebetween, without interfering with the functioning of a thrust balancing mechanism.

A further object of this invention is to provide an improvement for reducing the span between main bearings to offset the reduction in critical speed resulting from increased machinery size.

These objects, and other objects expressed or implied in this document, are accomplished by a novel improvement for a turbine generator or pump having main bearings separated by a span of shaft and a thrust equalizing mechanism adjacent one of said main bearings, the improvement comprising a stationary spacer interposed between the thrust equalizing mechanism and its adjacent main bearing to reduce the span between said main bearings. Preferably the spacer is composed of material that shrinks less than the shaft of the generator, and the height of the spacer, i.e., the spacing dimension, is selected according to desired thrust equalizing mechanism operating parameters over a temperature range. For a turbine generator or pump having main bearings separated by a span of shaft and a thrust equalizing mechanism which includes a stationary thrust plate adjacent one of the main bearings and a variable orifice defined between the thrust plate and a throttle plate affixed to the shaft, an improvement comprising a stationary length compensator interposed between the thrust plate and its adjacent main bearing to space said adjacent main bearing from the thrust plate in order to reduce the span between said main bearings. Preferably the length compensator is composed of material that shrinks less than the shaft of the generator, and the heights of the thrust plate and the length compensator are selected to produce a desired variable orifice over a range of operating temperatures.

Benefits and features of the invention are made more apparent with the following detailed description of a presently preferred embodiment thereof in connection with the accompanying drawings, wherein like reference numerals are applied to like elements.

In summary, the present invention is a turbine in combination with a TEM. While the turbine with TEM is previously described, the improvement is a turbine in combination with a TEM and in combination with a spacer between thrust plate and bearing. The inventive spacer is only applied to hydraulic machines, pump or turbine, with thrust balancing or equalizing mechanisms. In the case of turbines, the inventive spacer is applied to the design as an improvement to TEM technology, i.e., between the bearing and thrust plate.

The TEM is associated with a sealless turbine generator mounted on a single shaft compising a radial turbine having a unique thrust equalizing mechanism mounted thereto and operative with a portion of the applied hydraulic fluid to the turbine radial runner and a thrust bearing for equalizing the generated thrust forces by providing a small axial, bidirectional movement of the thrust bearing and the elements mounted on the single shaft and an induction generator driven by the turbine. The shaft along with the induction generator and the turbine components except the turbine runner are isolated in a common housing and the entire assembly included in a submersible containment vessel having a fluid inlet and outlet for receiving the input hydraulic fluid flow at a preselected fluid pressure and velocity for controlling the speed of the turbine. The induction generator includes a variable frequency, exciting current source for the generator stator windings that permits changing the synchronous speed of the generator as required by the hydraulic fluid flow and hydraulic fluid head to permit the overall efficiency of the turbine generator to be optimized. The turbine generator is operative with liquified gases that may be utilized to lubricate and cool the thrust bearing and the induction generator by the small portion of the operative fluid utilized for operating the thrust equalizing mechanism.

It will be appreciated that this hydraulic turbine operates in reverse mode as a pump. All centrifugal pumps operated in reverse act as radial inflow turbines, and all radial inflow turbines operated in reverse act as centrifugal pumps. Similarly, electrical induction motors can be operated as induction generators.

The present invention is an improvement of a hydraulic turbine generator or pump, which is operable in cryogenic conditions. The present invention further consists of main bearings separated by a span of shaft and a thrust equalizing mechanism adjacent one of said main bearings, an improvement consists essentially of a stationary spacer interposed between the thrust equalizing mechanism and its adjacent main bearing to reduce the span between said main bearings. The improvement in which the spacer is composed of material that shrinks less than the shaft of the generator. Moreover, the improvement in which the height of the spacer is selected according to desired thrust equalizing mechanism operating parameters over a temperature range. And the improvement in which the height of the spacer is selected according to desired thrust equalizing mechanism operating parameters over a temperature range.

The present invention is also for a turbine generator or pump which has main bearings separated by a span of shaft and a thrust equalizing mechanism which includes a stationary thrust plate adjacent one of the main bearings and a variable orifice defined between the thrust plate and a throttle plate affixed to the shaft, an improvement which consists essentially of a stationary length compensator interposed between the thrust plate and its adjacent main bearing to space said adjacent main bearing from the thrust plate in order to reduce the span between said main bearings. The improvement in which the length compensator is composed of material that shrinks less than the shaft of the generator. Also, the improvement in which the heights of the thrust plate and the length compensator are selected to produce a desired variable orifice over a range of operating temperatures. Moreover, the improvement in which the heights of the thrust plate and the length compensator are selected to produce a desired variable orifice over a range of operating temperatures.

The present invention is further a turbine generator or pump which has main bearings separated by a span of shaft and a thrust equalizing mechanism which further includes a stationary thrust plate adjacent one of the main bearings, an improvement that consists essentially of stationary means interposed between the thrust plate and its adjacent main bearing to space said adjacent main bearing from the thrust plate in order to reduce the span between said main bearings. And the improvement in which the said means is composed of material that shrinks less than the shaft of the generator. Also, the improvement in which the height of said means is selected according to desired thrust equalizing mechanism operating parameters over a temperature range. Moreover, the improvement in which the height of said means is selected according to desired thrust equalizing mechanism operating parameters over a temperature range.

DETAILED DESCRIPTION OF THE PREFERRED EMBODIMENT

The description that follows is presented to enable one skilled in the art to make and use the present invention, and is provided in the context of a particular application and its requirements. Various modifications to the disclosed embodiments will be apparent to those skilled in the art, and the general principals discussed below may be applied to other embodiments and applications without departing from the scope and spirit of the invention. Therefore, the invention is not intended to be limited to the embodiments disclosed, but the invention is to be given the largest possible scope which is consistent with the principals and features described herein.

Figure 1:
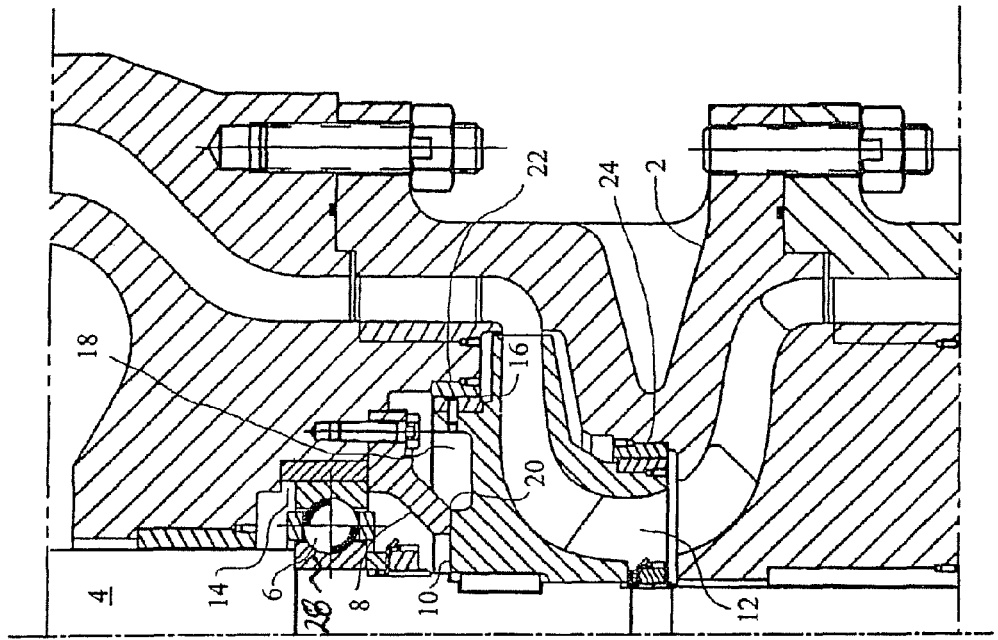
FIG. 1 is a partial cross-sectional view of a pump/turbine generator in the vicinity of the lower main bearing and encompassing the runner/impeller of the prior art.
Figure 2:
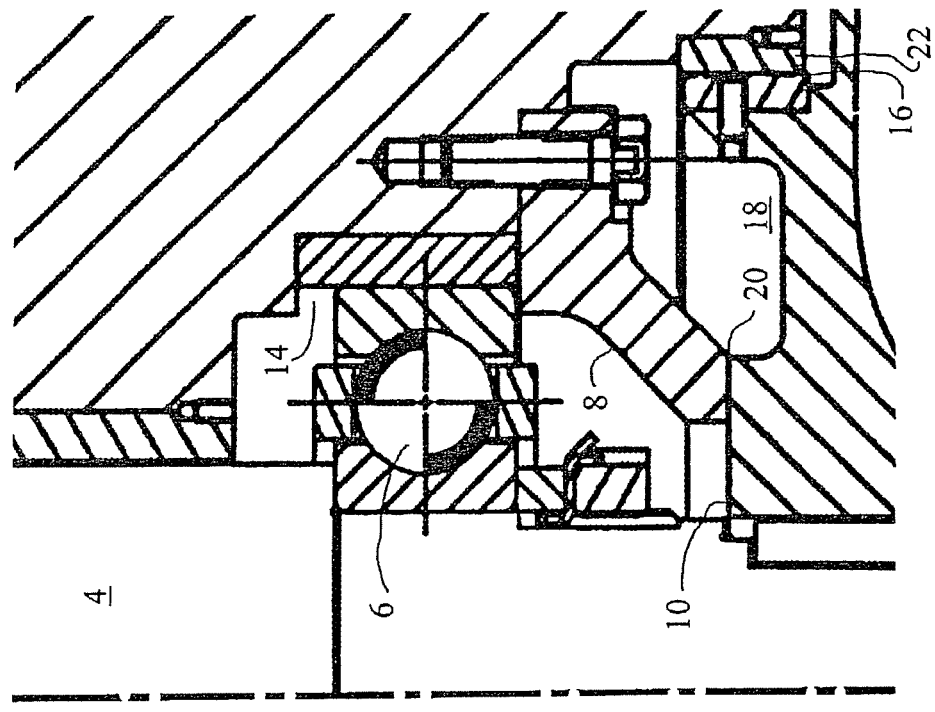
FIG. 2 is a more detailed view cut from FIG. 1 focusing on the thrust plate throttle ring interface.

Referring to FIGS. 1 and 2, a prior art machine with a conventional thrust equalizing mechanism, hereafter "TEM", is illustrated to have a housing 2, a shaft 4, a lower bearing 6, a stationary thrust plate 8, a throttle ring 10 affixed to the shaft 4, a runner 12, a gap 14 above the lower bearing which allows the shaft 4 (and the bearing 6 and throttle ring 10) to rise in response to any unbalance thrust from below, a fixed orifice 16 which communicates product fluid to a chamber 18 disposed above the throttle ring, a variable orifice 20 defined between thrust plate 8 and the throttle ring 10, an upper wearing ring 22, and a lower wearing ring 24. The operation of the thrust equalizing mechanism is simple. The upper wearing ring 22 is larger in diameter than the lower wearing ring 24 resulting in a net resultant force in the upper direction. Due to this upward force, the shaft 4, and all its rotating components move upward, the upward movement of the throttle ring 10 reducing the variable orifice 20 between it and the thrust plate 8, thus restricting the wearing ring leakage flow and causing the pressure in the chamber 18 to increase. Due to increased pressure in the chamber 18, the thrust is reversed and now acts in a downward direction. This causes the rotating assembly to move downward, thereby opening the variable orifice allowing the pressure in the chamber 18 to decrease. The operation vacillates back and forth automatically adjusting the pressure in chamber 18 sufficient to offset the upward thrust. Continuous self-adjustment allows the product-lubricated ball lower bearing 6 to operate essentially at zero thrust load over the entire usable capacity range. This feature substantially increases the reliability of the bearings, and reduces equipment maintenance requirements.

Figure 3:
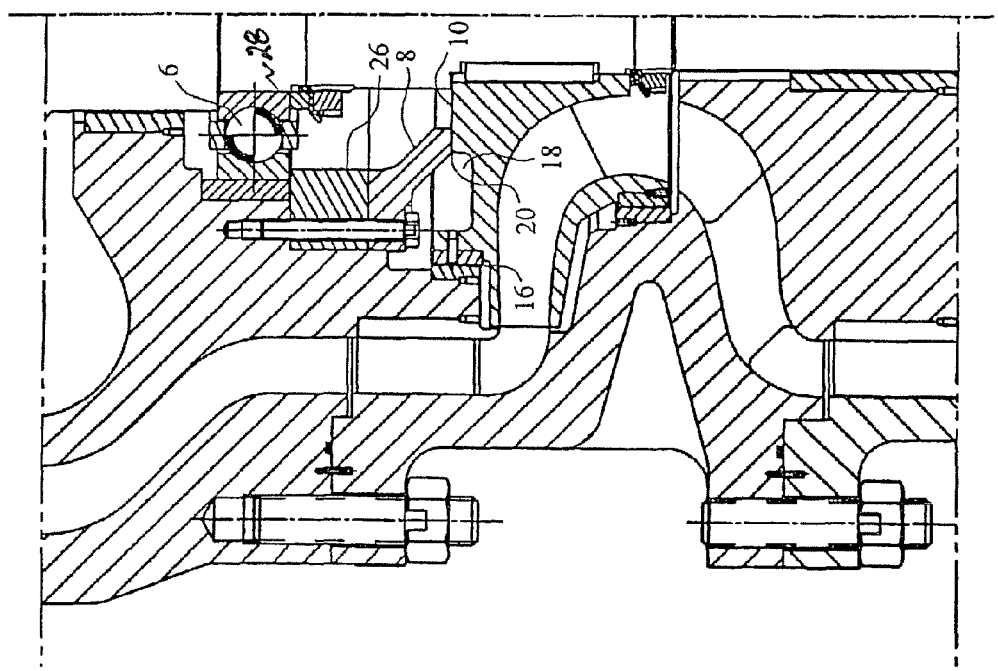
FIG. 3 is a partial cross-sectional view of a pump/turbine generator according to this invention focused in the vicinity of the lower main bearing and encompassing the runner/impeller.
Figure 4:
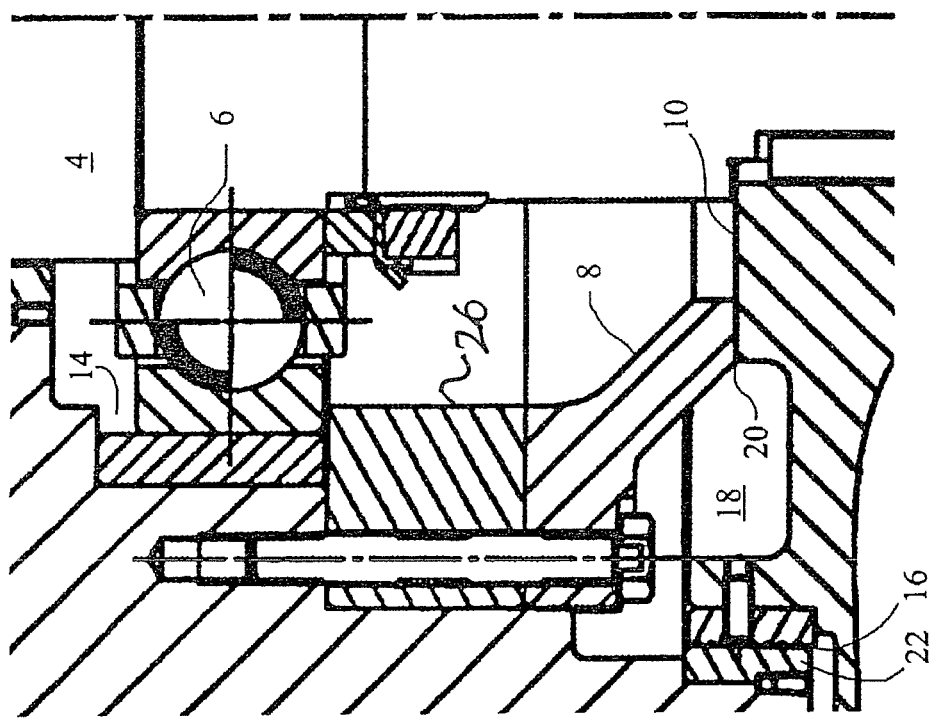
FIG. 4 is a more detailed view cut from FIG. 3 focusing on the thrust plate-throttle ring interface of the present invention.

As explained above, it is desirable to reduce the span between the upper main bearing 506 (NOT SHOWN) and lower bearing 6 in order to offset the reduction in the critical speed resulting from an increased generator or motor size. However, relocating the lower bearing 6 by the requisite amount would entail a dramatic increase in the length of the thrust balancing device, and the resultant differential shrink between the thrust plate 8 material and the shaft 4 would cause the variable orifice gap 20 to increase to such a degree that the thrust equalizing device would be rendered inoperable. Referring to FIGS. 3 and 4, the solution to this problem is to integrate another component, a length compensator or spacer 26, within the device composed of a material that shrinks less than the shaft 4. The spacer 26 is interposed between the bearing block 28 and the thrust plate 8 to space the lower bearing 6 higher, i.e. closer to the upper main bearing 506 (NOT SHOWN). In one embodiment, spacer 26 is composed of material that possesses less than 1% of thermal linear contraction and spacer 26 should shrink less than shaft 4. Moreover, the height of spacer 26 is selected such that it is operative between 70 K and 140 K, the operating temperature range of the cryogenic liquid machinery. According to this invention, the individual heights of the thrust plate 8 and spacer 26 are selected to produce the desired variable orifice gap 20 at the actual operating temperature that will result in the most effective thrust balancing and highest machine efficiency.

Figure 5:
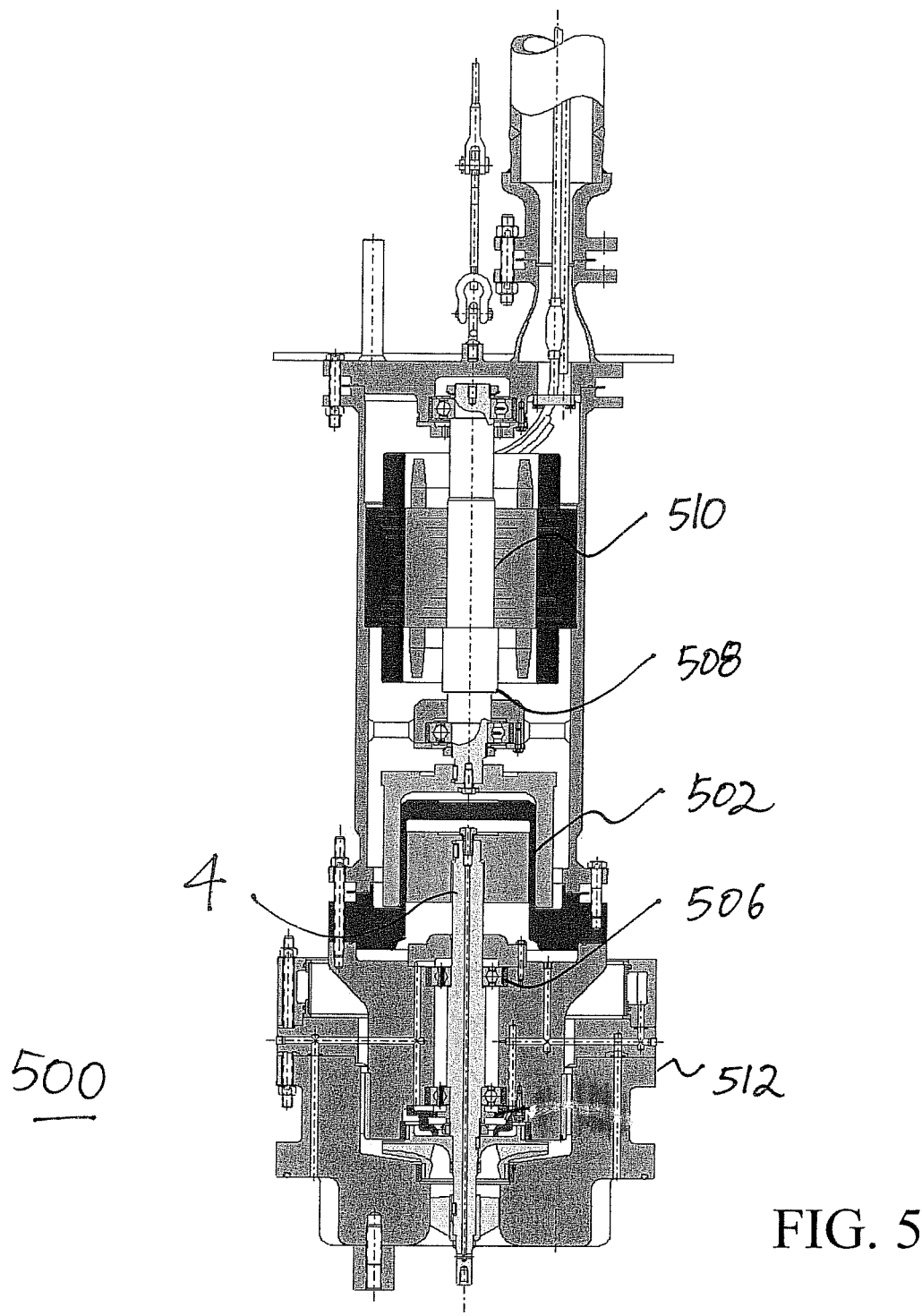
FIG. 5 is a partial cross-sectional view of an aggressive fluid pump 500 with a magnetic coupling 502 of the present invention.
Figure 6:
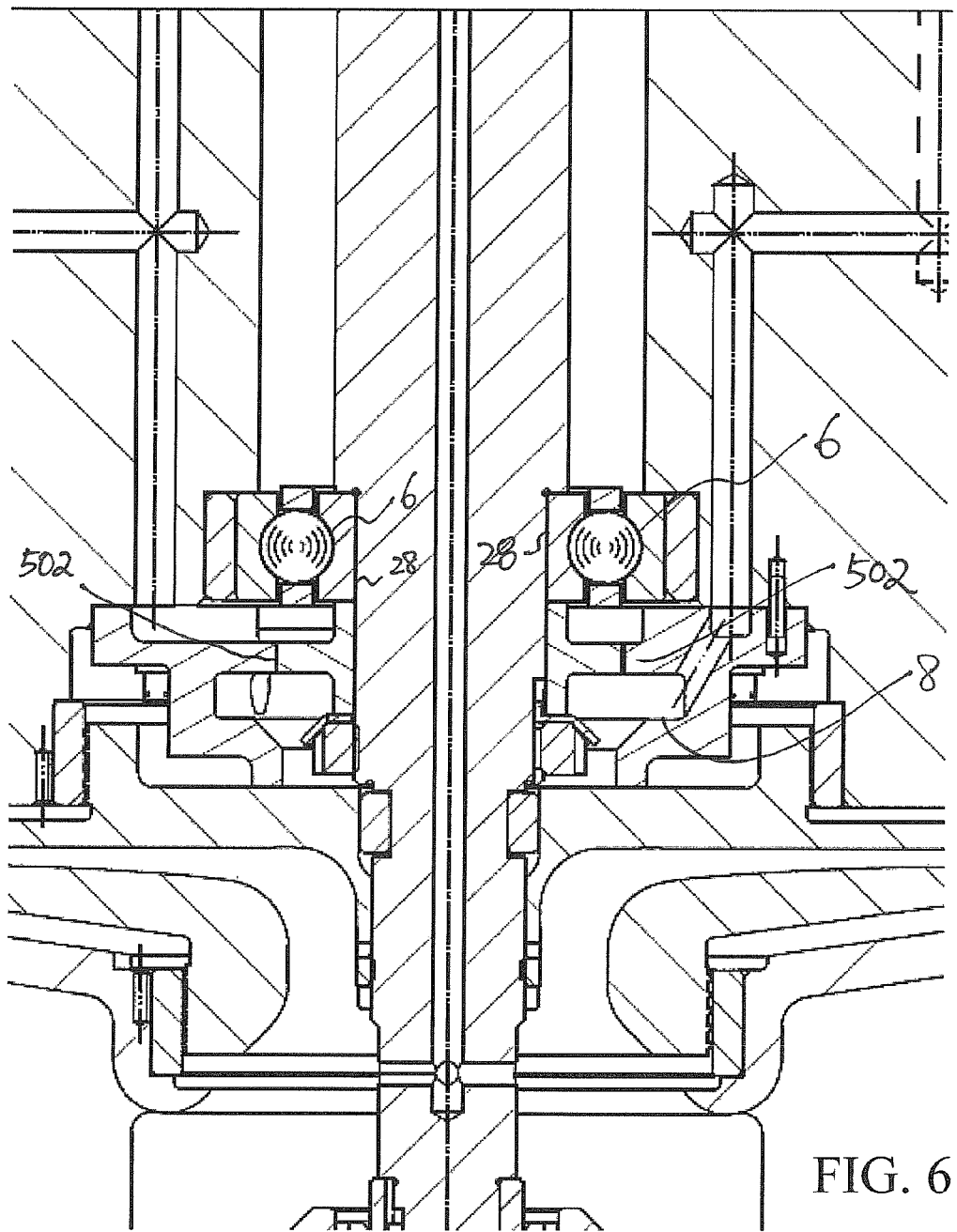
FIG. 6 is a detail view of the thrust plate-throttle ring interface of the present invention.
Figure 7:
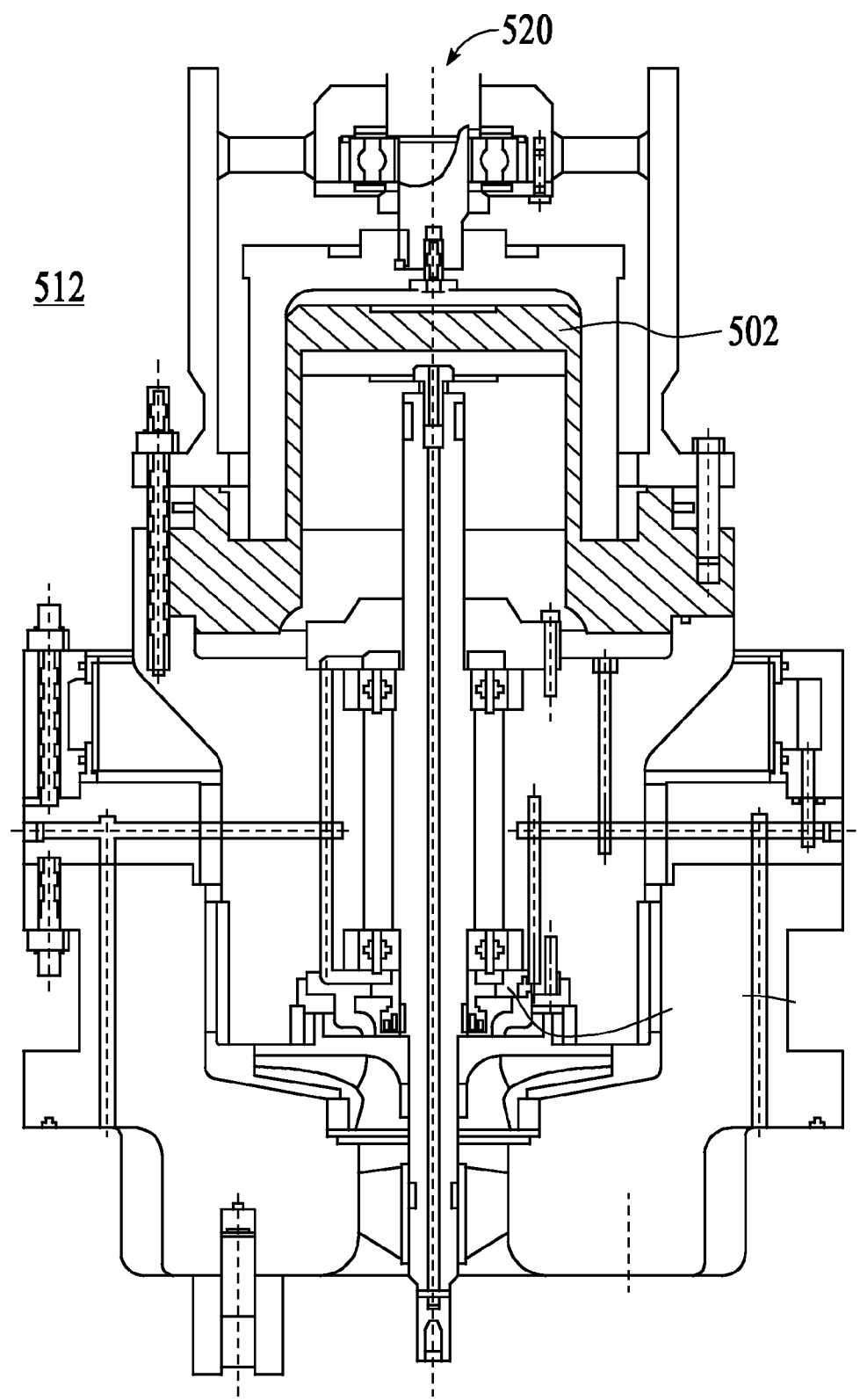
FIG. 7 is a partial cross-sectional view of an alternative design of an aggressive fluid machine 500' with a magnetic coupling 502 of the present invention.

FIG. 5 is a partial cross-sectional view of an aggressive fluid pump/turbine 500 with a magnetic coupling 502. FIG. 6 is a more detailed view cut from FIG. 5 focusing on the thrust plat-throttle ring interface. FIG. 7 is a partial cross-sectional view of an alternative design of an aggressive fluid hydraulic machine 500' with a magnetic coupling 502. FIG. 5 shows an alternative of the present invention that is designed for aggressive fluid such as LNG, ammonia, or other flammable or explosive liquefied gases. As best shown in FIG. 5, since either a motor or generator cannot be submerged in the process aggressive fluid as the configuration in FIGS. 3 and 4, an additional magnetic coupling 502 is installed and sealed between the TEM hydraulic machinery 512 to said generator/motor 508. The main function of magnetic coupling 502 is to seal generator/motor 508 from process liquid and more importantly to transfer torque from the TEM hydraulic machinery 512 to said generator/motor 508. Hence separating generator/motor 508 from the process fluid. In one embodiment, TEM hydraulic machinery 512 and generator/motor 508 have separate shaft 4 and 510 respectively. As best shown in FIG. 6, an alternative design of spacer 502 is placed within the device interposed between the bearing block 28 and the thrust plate 8 to space the lower bearing 6 higher. In one embodiment, spacer 502 composed of a material that shrinks less than the shaft 4.

As shown in FIG. 7, the TEM hydraulic machinery 512 with magnetic coupling 502 of the present invention can not only can process aggressive fluids, but is capable of connecting to any other piece of rotary machinery or equipment such as, but not limited to, electric generators, motors, compressors, oil brakes, and other hydraulic systems. Thus, a magnetic coupling 502 can be used to couple to the shaft 520 of essentially any rotatory type equipment or machine, such as other hydraulics, generator, motor, etc.

Use of the spacer concept in equipment handling ammonia or other aggressive fluid design, the motor cannot be submerged in the process fluid, so a magnetic coupling 204 is employed to transfer the torque from the hydraulics to the motor, or in the case of an expander from the hydraulics to the generator. As stated above, this design does not have to be connected to a motor or generator, but it can alternatively be connected to some other rotating equipment or hydraulics.

The foregoing description and drawings were given for illustrative purposes only, it being understood that the invention is not limited to the embodiments disclosed, but is intended to embrace any and all alternatives, equivalents, modifications and rearrangements of elements falling within the reasonable scope of the claims which follow herein.

This Application is related to and an improvement over U.S. Pat. No. 5,659,205, issued Aug. 19, 1997, entitled "HYDRAULIC TURBINE POWER GENERATOR INCORPORATING AXIAL THRUST EQUALIZATION MEANS", which is incorporated herein by reference in its entirety. The above TEM patent teaches an improved hydraulic turbine electrical power generator that is operable as a submerged hydraulic turbine electrical power generator that has a long life, seal-less, submerged turbine generator that functions very well and may be readily adjusted for optimum efficiency in operation and includes a self-limiting runaway speed by balancing out the pressures generated by the centrifugal forces in the turbine against the input hydraulic fluid flow pressure. This later feature is very important for submerged turbine generators due to the fact there is no way to stop the turbine in the event it reaches runaway speeds. The turbine is further provided with a unique thrust equalizing mechanism utilizing a portion of the input fluid flow to balance the generated thrust forces as well as utilizing the portion of the input fluid flow to lubricate the ball bearing for the turbine and cooling the electric power generator.

The thrust equalizing mechanism for the turbine utilizes the prior art thrust equalizing mechanism (TEM) developed by G. L. Weisser for submersible pumps for cryogenic liquids and adapted for use in a turbine by mounting the ball bearing to traverse small, bidirectional movements of the shaft assembly for balancing out the generated thrust forces.

The preferable orientation of the hydraulic turbine generator is in a vertical orientation to achieve one hundred percent balancing of all forces whereby the overall efficiency of the turbine generator is optimized. The pump and turbine of the present invention has a vertical orientation, i.e., a vertical rotational axis with predominantly vertical flow through the machine, as distinguished from prior art pumps with horizontal rotational axis and vertical flow. While flow of liquid within the vertical orientation pump and turbine passes from stage to stage, flow through the vertical pump or turbine is predominantly upward or vertical, as shown in FIGS. 3-7.

The electric power generator is preferably in the form of an induction generator having a rotor and a stator exciting winding controllable to provide varying synchronous speeds for the generator and thereby permits the frequency of the exciting current for the generator to be uniquely varied to produce a preselected output frequency from the generator despite the variations of the input hydraulic fluid pressure and flow as well as varying the pressures generated by the centrifugal forces of the turbine without resorting to the use of adjustable guide vane assemblies or the like for the turbine runners. The hydraulic turbine generator is assembled on a single shaft mounted between a pair of ball bearing without any dynamic seals between the turbine generator and the environment.

From a structural standpoint, the TEM of the present invention comprehends a single shaft assembly having a hydraulic turbine and an electrical power generator in the form of an electrical induction generator mounted on opposite sides of a ball bearing with a radial bearing mounted to one end of the shaft on the outside of the electrical power generator. The power generator has a rotor mounted to be rotatable with the shaft rotations and axially movable therewith and arranged with a stator having an exciting electrical winding that is excitable from an A.C. source providing electrical signals of varying frequencies for varying the synchronous speed of the power generator as required by the flow and head of the input hydraulic turbine that produce variable speeds to produce a constant frequency output from the generator.

The hydraulic turbine is a radial turbine having the thrust equalizing mechanism operable with the turbine radial thrust equalizing runner for balancing out the thrust forces through the small axial, bidirectional movements designed into the single shaft and ball bearing therefore.

The present invention is directed to equipment and machinery used in processing and handling aggressive fluids such as ammonia, LNG, or other flammable or explosive liquefied gases.

Unless defined otherwise, all technical and scientific terms used herein have the same meaning as commonly understood by one of ordinary skill in the art to which the present invention belongs. Although any methods and materials similar or equivalent to those described can be used in the practice or testing of the present invention, the preferred methods and materials are now described. All publications and patent documents referenced in the present invention are incorporated herein by reference.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, with the limits only of the true purview, spirit and scope of the invention.

I claim:

1. A thrust equalizing mechanism for use with a hydraulic turbine-electrical power generator in a vertical orientation with vertical rotational axis mounted on a single shaft as a shaft assembly and a ball bearing mounted intermediate the turbine and power generator in a common housing except the turbine runner is mounted on the shaft outside the common housing adjacent the ball bearing, and a containment vessel enclosing the common housing and the shaft in a spaced relationship therewith, said ball bearing having an inner race secured to said shaft and an outer race loosely mounted against the common housing with a bearing clearance for permitting the shaft to move axially, bidirectionally, a predetermined axial distance, said thrust equalizing mechanism comprising a stationary thrust plate ring means mounted to said housing between the housing and said turbine runner, said runner means including throttling ring means constructed and defined integrally with said runner means on one side thereof for coaction with the thrust plate ring means for defining a substantially fixed orifice for receiving a portion of a high velocity hydraulic turbine flow coupled to impinge on said runner means and a variable orifice defined between the throttling ring means and the thrust plate means and varying in size in accord with said movements of said shaft and receiving the hydraulic fluids at said variable orifice from said fixed orifice, said variable orifice opening being initially greater than said fixed orifice opening, the arrangement and construction of the variable orifice and said thrust plate ring means permits the hydraulic fluid to be conveyed through said ball bearing and through said common housing, said thrust equalizing mechanism further including first ring wear means secured to said common housing and spaced from said throttling ring means and second wear ring means secured to said containment vessel adjacent said fluid discharge end of said runner means, the arrangement and construction of the diametrical spacing of said first wear ring means is defined to be larger than the diametrical spacing of said second wear ring means for creating thrust forces effective to cause the shaft assembly to move axially in the direction of the thrust forces until said thrust plate ring means engages said throttling ring means whereby the variable orifice is closed thereby throttling the hydraulic fluid flow into the variable orifice, said closed condition of said variable orifice defines a chamber between said first ring means and the closed variable orifice allowing fluid pressure to build up therein so when the pressure is build up in said chamber to a preselected level for offsetting the thrust forces created and leading to a movement of said shaft assembly away from said fluid throttling condition and thereby resulting in a continuous fluid flow into the variable orifice and the reduction of the pressure built up in said chamber whereby the balancing of the generated thrust forces occur gradually and smoothly and without overshoot with the continuous bidirectional, alternate axial movements of the shaft assembly, conduit means coupled to said housing for conveying said portion of the fluid in the housing to adjacent the fluid discharge side of said runner means; and a stationary spacer composed of material having low thermal linear contraction such that the stationary spacer shrinks less than the shaft of the generator interposed between the thrust plate and the bearing blocks of its adjacent main bearing to reduce the span between said main bearings, the height of the spacer selected such that it is operative between 70 K and 140 K, the operating temperature range of the cryogenic liquid turbine generator.

2. The thrust equalizing mechanism for use with a hydraulic turbine-electrical power generator as defined in claim 1 wherein said predetermined axial distance of movement of said shaft assembly due to said bearing clearance is approximately the same as the distance of said variable orifice between said throttling ring and thrust plate ring means.

3. The thrust equalizing mechanism for use with a hydraulic turbine-electrical power generator as defined in claim 1 wherein said shaft assembly is mounted in a vertical orientation for balancing out all of the forces.

4. The thrust equalizing mechanism for use with a hydraulic turbine-electrical power generator as defined in claim 1 wherein said spacer composed of material having less than 1% linear contraction.

\* \* \* \* \*